US006531687B2

(12) United States Patent
Michelmann

(10) Patent No.: US 6,531,687 B2
(45) Date of Patent: Mar. 11, 2003

(54) KNITTED TWO-DIMENSIONAL HEATING ELEMENT

(75) Inventor: Jochen Michelmann, Gelnhausen (DE)

(73) Assignee: I.G. Bauerhin GmbH, Gründau/Rothenbergen (DE)

( * ) Notice: Subject to any disclaimer, the term of this patent is extended or adjusted under 35 U.S.C. 154(b) by 58 days.

(21) Appl. No.: 09/818,397

(22) Filed: Mar. 27, 2001

(65) Prior Publication Data

US 2001/0027973 A1 Oct. 11, 2001

(30) Foreign Application Priority Data

Mar. 27, 2000 (DE) ........................................ 100 14 819
Mar. 13, 2001 (DE) ........................................ 101 12 405

(51) Int. Cl.[7] .............................. H05B 3/34; B60N 2/56

(52) U.S. Cl. ....................... 219/529; 219/545; 219/541; 139/425 R; 297/180.12

(58) Field of Search ................................ 219/529, 202, 219/211, 212, 217, 541, 542, 545, 549; 29/611; 28/110, 115, 140, 142, 151; 139/425 R; 297/180.12

(56) References Cited

U.S. PATENT DOCUMENTS 2,375,997 A 5/1945 Larson ....................... 219/46
4,814,585 A * 3/1989 Klein ......................... 219/545
6,020,578 A * 2/2000 Putz ........................... 219/545
6,160,246 A * 12/2000 Rock et al. ................. 219/545
6,415,501 B1 * 7/2002 Schlesselman et al. ....... 29/611

FOREIGN PATENT DOCUMENTS

DE 41 01 290 7/1992 ............ H05B/3/34
DE 41 24 684 1/1993 ............ H05B/3/34
EP 0 939 579 1/1999 ............ H05B/3/34

* cited by examiner

*Primary Examiner*—Joseph Pelham
(74) *Attorney, Agent, or Firm*—Cohen, Pontani, Lieberman & Pavane

(57) ABSTRACT

A two-dimensional heating element, especially for seat heaters in the motor vehicle sector, having a textile base material and contact conductors and heating conductors which are electrically conductive and touch one another. The contact conductors delimit heating areas. The heating conductors are laid effectively in the direction of stitch wales and orthogonal to the stitch wales in such a way that there are at least two zones functioning at least as a main heating area and at least as a secondary heating area with different heating capacities.

20 Claims, 3 Drawing Sheets

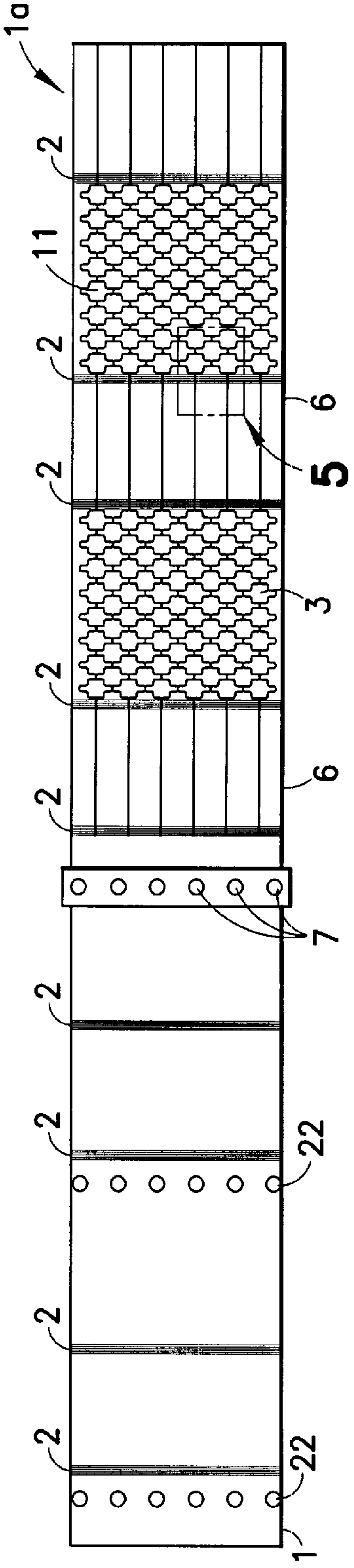
FIG.4
FIG.3
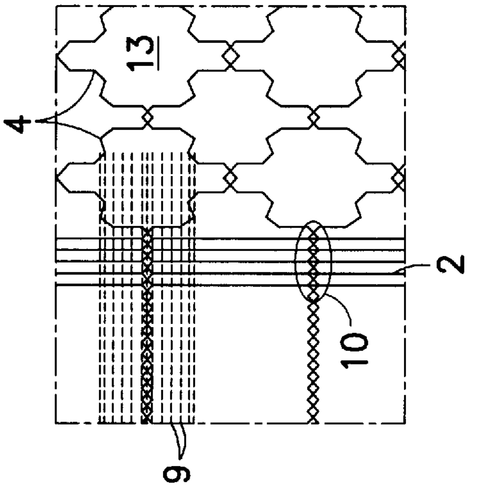
FIG.5

KNITTED TWO-DIMENSIONAL HEATING ELEMENT

BACKGROUND OF THE INVENTION

1. Field of the Invention

The present invention relates to a two-dimensional heating element for a seat heater in a motor vehicle having a textile base material and contact conductors and heating conductors which are electrically conductive and touch one another. The present invention further relates to a method of producing the two-dimensional heating element having contact conductors and heating conductors which are electrically conductive and touch one another. Furthermore, the present invention relates to an apparatus for producing the two-dimensional textile heating element according to the invention via a knitting process.

2. Description of the Related Art

For many years, electrical two-dimensional heating elements have been known which have a textile base material and electrically conductive contact and heating conductors. In general, two contact strips are arranged opposite one another and the heating conductors run from one contact strip to the other (see EP 0 541 047 A3, EP 0463 516 A2, EP 0 548 574 B1 and DE 4124684), each contact strip comprising a number of electrically conductive contact conductors. The heating capacity of such two-dimensional heating elements is determined in particular by the number of heating conductors, the thickness of the heating conductors and the length of the heating conductors. The length of the heating conductors depends on the spacing between the contact conductors and on the pattern of the heating conductors which is generated by the movement of a guide rail of a knitting machine as the conductors are connected to the textile base material. The quality of the heating element also depends on the quality of the mechanical connection between the heating conductors and the contact conductors. If there is a deficient connection between the heating conductors and the contact conductors, a high contact resistance results which produces an increased and undesirable development of heat at the connection (the heat is certainly not intended to accumulate at these contact points but is intended to be distributed over the individual heating conductors). The heat loss in the area of the contact conductors is often too high to provide adequate heating in the desired area. Furthermore, a great deal of heating conductor material is often consumed during the manufacturing process in the spaces between the individual heating elements being manufactured.

The known two-dimensional heating elements are produced with the aid of knitting methods which exhibit no proper reproducibility between patterns to be produced and the contact conductors already applied to the base material because of the expansibility of the base material.

SUMMARY OF THE INVENTION

An object of the present invention is to provide a two-dimensional heating element, a manufacturing method thereof, and a corresponding apparatus for production of the two-dimensional heating element via knitting which solve the problems of the prior art. More specifically, the object of the present invention is to provide a two-dimensional heating element which has a pattern adapted as far as possible to a respective use with regard to the heating capacity to be output and to provide a method and an apparatus which permit the cost-effective production of such a two-dimensional heating element.

According to an embodiment of the present invention, a two-dimensional heating element for seat heaters in a motor vehicle includes a base material, electrically conductive contact conductors arranged on the base material such that the contact conductors delimit a heating area on the base material, and electrically conductive heating conductors arranged on the base material for contacting the contact conductors and creating an electric connection therebetween. The heating conductors are arranged to form a pattern defining stitch wales, wherein some portions of the heating conductors are laid in the direction of the stitch wales and the other portions of the heating conductors are laid orthogonal to the stitch wales in at least two zones of the heating area. The at least two zones include a main heating area having a first heating capacity and a secondary heating area having a second heating capacity, the first heating capacity being different than the second heating capacity.

According to another embodiment of the invention, a method of producing a two-dimensional heating element having contact conductors defining a heating area on a base material and heating conductors arranged on the base material and contacting the contact conductors includes the steps of applying the contact conductors to the base material prior to a knitting process and performing the knitting process which includes detecting one of the contact conductors and markings on the base material using a sensor system arranged upstream of needles of a knitting machine, controlling a guide rail for the needles of the knitting machine in response to the sensor system, and connecting the heating conductors to the base material and the contact conductors via the needles and guide rail of the knitting machine.

According to yet another embodiment of the present invention, an apparatus for producing a two-dimensional textile heating element via a knitting process includes at least one guide rail and needles arranged for knitting heating conductors onto a base material, the guide rail being arranged for guiding the needles during the knitting and at least one sensor system arranged for detecting one of a contact conductor and markings applied to the base material and operatively connected to the guide rail for controlling the at least one guide rail during the knitting.

The two-dimensional heating element according to the present invention has a textile base material such as, for example, a nonwoven or a textile filament material which functions as a cannier, electrically conductive contacts and heating conductors touching one another and forming an electric connection.

The contact conductors define heating areas therebetween such that the heating areas are bounded by the contact conductors. Some portions of the heating conductors are laid effectively in the direction of the stitch wales and other portions of the heating conductors are laid orthogonal to the stitch wales such that the heating area includes at least two zones functioning as a main heating area and at least as a secondary heating area, wherein the two zones have different heating capacities.

This flexible type of pattern according to the present invention allows a heating area to include a main heating area for the main seating areas such as the seat and backrest part and two secondary lateral heating areas for the secondary seating areas such as the side cheeks of a seat. Accordingly, a single two-dimensional heating element may be configured for flexible heating of a seat matched to the sitting requirements.

The two-dimensional heating element according to the present invention may be produced by an apparatus according to the present invention.

The apparatus according to the present invention for producing two-dimensional textile heating elements includes needles for knitting heating conductors onto a textile base material, at least one guide rail for guiding the needles, and at least one sensor system arranged for detecting contact conductors and/or markings applied to the textile base material to control the at least one guide rail. This apparatus ensures the reproducibility of the heating-conductor pattern already mentioned above and allows relatively free control of the guide rails to produce the two-dimensional heating elements according to the present invention.

The apparatus may include a distance-measuring device to ensure very high reproducibility of the pattern. Such a device may include a conventional rotary encoder in which the path traced by the textile base material running over a roller is determined via a rotary angle measurement of the rotated roller and the diameter of the roller.

Furthermore, the two-dimensional heating element of according to the present invention may be produced according to a method of the present invention.

In the method according to the present invention for producing a two-dimensional heating element that includes contact conductors and heating conductors which are electrically conductive and contact one another to produce an electrical connection therebetween, the contact conductors are applied to a textile base material before the knitting process such as, for example, by adhesive bonding or sewing. In a subsequent knitting process, the heating conductors are connected to the textile base material and the contact conductors. During the knitting process, a sensor system of the apparatus for producing the two-dimensional heating element fitted upstream of needles of a knitting machine detects the contact conductors and/or markings applied to the textile base material and produces sensor signals in response to the detection of the contact conductors and/or markings. The markings may, for example, include stamped-out portions or metal pieces. The at least one guide rail of the knitting machine is controlled in response to the sensor signal. This method necessitates reproducible and simultaneously relatively free and cost-effective control. The control is carried out by the at least one guide rail of the knitting machine which is moved in response to data supplied by the sensor system and according to internally stored data via an electrical or hydraulic drive controlled by a computer. Ultimately, appropriate modification of the program of the computer may be made for changing the pattern of the heating areas. Accordingly, different heating capacities may be implemented.

The sensor system may, for example, comprise capacitive, inductive and/or optical sensors.

The following describes preferred embodiments which have been tested in practice.

The pattern of the two-dimensional heating element may be produced as appropriate for the respective specific requirement profile as follows: At least some of the heating conductors outside the heating areas lie only in the direction along the needle wales of a knitted weave and run without changes with respect to adjacent stitch wales (that is to say without changing to adjacent stitch wales), and/or at least some of the heating conductors in the area of the contact conductors lie only in the direction along the stitch wales of a knitted weave and run without changes with respect to adjacent stitch wales, and/or at least some of the heating conductors outside the heating areas do not run without changes with respect to the stitch wales, and/or at least some of the heating conductors in the area of the contact conductors do not run without changes with respect to the needle wales.

The heating areas are the areas in which the heating conductors are knitted onto the base material to form a required pattern. The course of the heating conductors in the area of the contact conductors along the stitch wales leads to a more permanent connection of these conductors to the contact conductors, thereby reducing the undesired inherent heating of the individual contact strips. Outside the heating areas and/or inside the contact conductors, heating conductor material is also saved by this guiding technique of the heating conductors along the stitch wales.

In a further embodiment, the heating conductors float and are not woven in to the textile base material outside the heating areas and the contact conductors. Accordingly, when the textile base material is cut to size, the heating conductors sticking out at the respective ends may be shortened more easily. This facilitates the prevention of inadvertent contacts of the heating conductors with the surrounding materials and therefore reduces the possibility of potential short circuits.

In a further embodiment, a different amount of heating conductor material is applied in the heating areas in the direction along the contact conductors. This allows different two-dimensional heating capacities to be implemented which is required for locally differentiated heating of the seating area. More specifically, this allows the production of a heating area with more seat heat continuously and deliberately from the top to the bottom or vice versa for the backrest area of car seat heaters. Such a two-dimensional heat capacity distribution may generally be implemented by an appropriately designed guide rail. The various patterns possible with the free programming according to the present invention in the direction orthogonal to the direction along the contact conductors may be implemented by the at least one guide rail.

In a preferred embodiment, the knitted weave comprises a weave from the group of stitches including pillar-stitch, pillar-weft, tricot and satin weaves, which weaves have been tried and tested.

Furthermore, the contact conductors are metallic conductors such as, for example, copper conductors which may generally be produced cost-effectively.

The heating conductors are preferably carbon fibers since these have been tried and tested in practice.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like references denote similar elements throughout the several views:

FIG. 3 is a schematic diagram of a base material provided with contact conductors before the knitting process of the present invention;

FIG. 4 is a schematic diagram of the base material shown in FIG. 3 after the knitting process;

FIG. 5 is an enlarged view of a detail of the knitted base material shown in FIG. 4.

DETAILED DESCRIPTION OF THE PRESENTLY PREFERRED EMBODIMENTS

Figure 1:
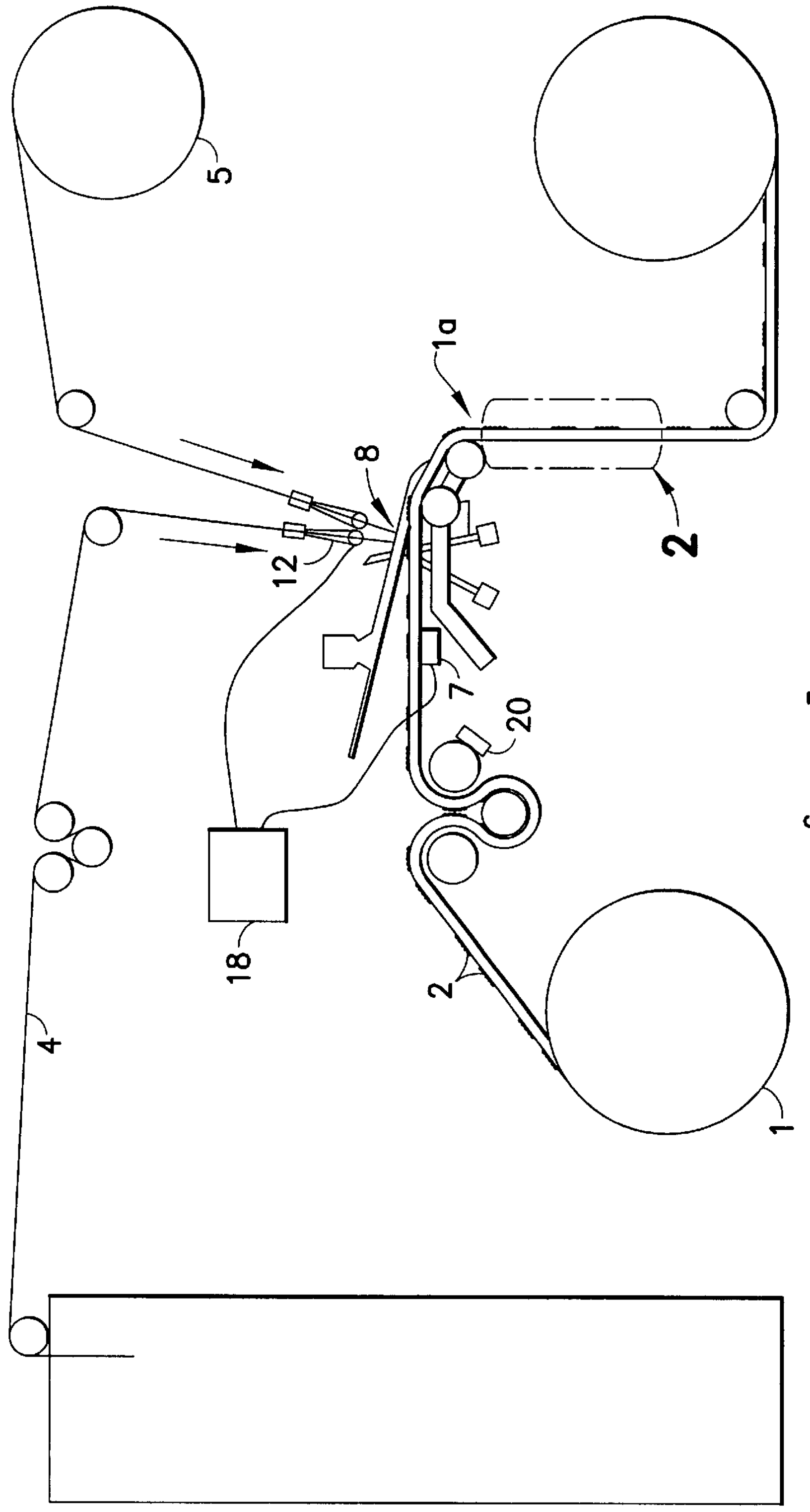
FIG. 1 is a schematic diagram of an apparatus for producing a two-dimensional heating element according to a method according to the present invention.

FIG. 1 is a schematic diagram showing an apparatus for producing a two-dimensional heating element according to a method of the present invention.

According to this method, a base material 1 such as, for example, a textile fabric, a knitted fabric, or a nonwoven fabric having contact conductors 2 is led from a roll and over a number of guide rollers, past a sensor system 7, to a knitting machine including a guide rail 12 and needles 8 required for the knitting process.

At the same time, heating conductors 4 (only one heating conductor 4 is shown in FIG. 1) are led over a number of guide rollers and fed to the guide rail 12. The guide rail 12 is controlled via the sensor system 7 by a computer 18. The sensor system 7 detects and processes the positions of the individual contact conductors 2. Accordingly, defined control of the guide rail 12 may be effected in response to the positions of the contact conductors 2.

To fix the heating conductor onto the base material 1, a textile thread 5 is fed from a different roll to the guide rail 12 at the same time that the heating conductors 4 are fed to the guide rail 12, thereby permitting the heating conductors 4 to be sewn onto the base material 1 therewith.

After the application of the heating conductors 4 to the base material 1, the material web 1*a* including the base material 1 with the heating conductors 4 is preferably rolled up.

Figure 2:
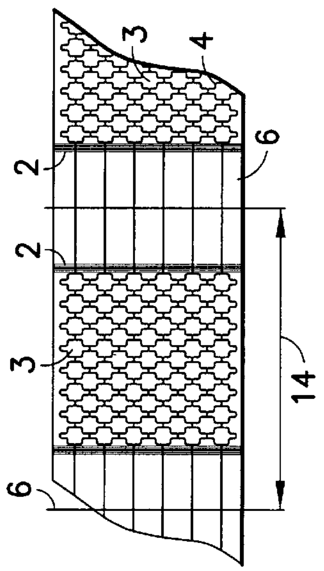
FIG. 2 is a schematic diagram of heating elements and their associated heating areas produced in accordance with the method according to the present invention.

FIG. 2 shows the material web 1*a* including the base material 1 with the heating conductors 4. The material web 1*a* includes heating elements 14 which are not yet separated from one another. Each heating element 14 has a central main heating area 3 in which, depending on the requirement profile, one or more patterns of the heating conductors 4 are arranged. The main heating areas 3 are each bounded by two contact conductors 2. Outside the contact conductors 2 of two adjacent main heating areas 3, the heating conductors 4 run substantially parallel to one another in the direction of the next contact conductor 2 of the adjacent main heating area 3. A separation area for separating the heating elements 14 from one another is located at a center of an intermediate area 6 located between two main heating areas 3.

FIG. 3 shows the base material 1 before the knitting process. The individual contact conductors 2 are spaced apart from one another and delimit the areas of individual subsequent heating areas 3. Markers 22 may optionally be placed on the base material 1 in addition to the contact conductors 2. The sensor system 7 is used during the knitting process for the specific control, as explained above, of the guide rail 12 to generate the required patterns of heating conductors 4 in response to the detection of the contact conductors 2 or the markers 22.

FIG. 4 shows the material web 1*a* including the base material 1 shown in FIG. 3 after the knitting process. The individual main heating areas 3 are now occupied by the heating conductors 4 in the form of a respective pattern 11. FIG. 4 also shows that in the intermediate areas 6 between the respective main heating areas 3 and their contact conductors 2, the heating conductors run parallel to one another along the stitch wales of the material web 1*a*.

FIG. 5 is an enlarged area of a detail around a contact conductor 2 on the material web 1*a*. In the main heating area 3, the individual heating conductors 4 form a pattern 11 and, at the same time, define stitch wales 13. The contact conductors 2 cross the heating conductors 4 and in each case form contacts 10 between the contact conductors 2 and the heating conductors 4. FIG. 5 also shows the textile mesh-forming threads 9 of the base material 1. To ensure high reproducibilty of the pattern 11, the apparatus of FIG. 1 also includes a distance measuring device 20 for measuring the distance traveled by the base material 1. The distance measuring device may include a conventional rotary encoder for determining the distance via a rotary angle measurement of the rotated roller and the diameter of the roller.

Figure 6:
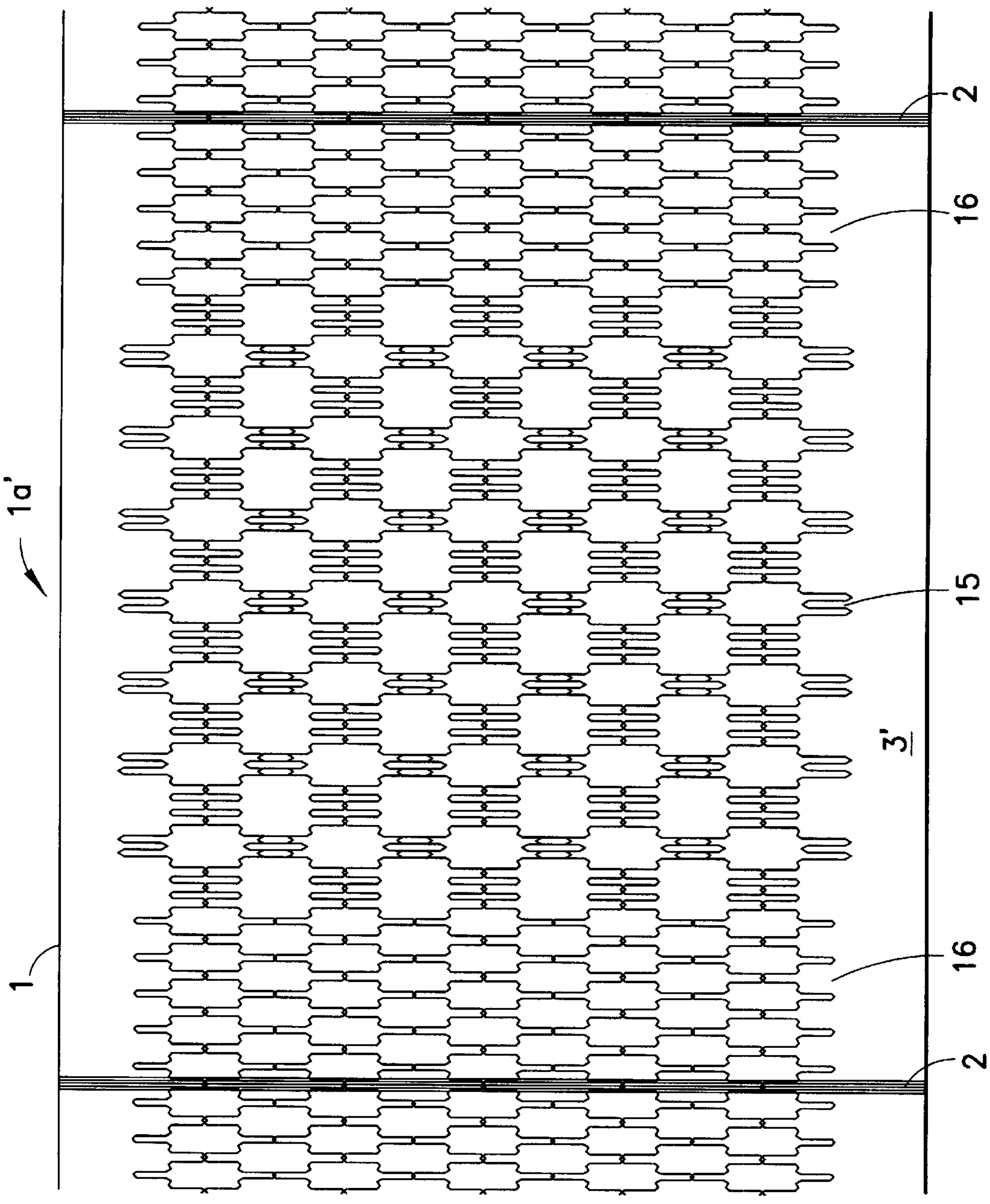
FIG. 6 shows a schematic diagram of a further embodiment of the knitted base material according to the present invention.

FIG. 6 shows a further embodiment of the material web 1*a*' knitted in accordance with the present invention. Arranged between two of the contact conductors 2 is the heating area 3' which includes a main heating area 15 and two adjacent secondary heating areas 16. This pattern is designed for a seat so that the main heating area 15 is used for heating the seat or the rear part of a seat and the secondary heating areas 16 are used for heating the side checks of the seat.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A two-dimensional heating element for seat heaters in a motor vehicle, comprising:

a base material;

contact conductors being electrically conductive and arranged on said base material such that said contact conductors delimit a heating area on said base material; and heating conductors being electrically conductive and arranged on said base material for contacting said contact conductors and creating an electric connection therebetween, said heating conductors being arranged to form a pattern defining stitch wales, wherein some portions of said heating conductors are laid in the direction of said stitch wales and other portions of said heating conductors are laid orthogonal to said stitch wales in at least two zones of said heating area, said at least two zones comprising a main heating area having a first heating capacity and a secondary heating area having a second heating capacity, said first heating capacity being different than said second heating capacity.

2. The two-dimensional heating element of claim 1, wherein said two-dimensional heating element is produced using an apparatus comprising at least one guide rail and needles arranged for knitting heating conductors onto a base material, said guide rail arranged for guiding said needles during the knitting, and at least one sensor system arranged for detecting one of a contact conductor and markings applied to the base material and operatively connected to said guide rail for controlling said at least one guide rail during the knitting.

3. The two-dimensional heating element of claim 1, wherein said two-dimensional heating element is produced in accordance with a method comprising the steps of applying said contact conductors to said base material prior to a knitting process, and performing the knitting process which includes detecting said contact conductors on said base material using a sensor system arranged upstream of needles of a knitting machine, controlling a guide rail for the needles of the knitting machine in response to the sensor system, and connecting said heating conductors to said base material and said contact conductors via the needles and the guide rail of the knitting machine.

4. The two-dimensional heating element of claim 1, wherein at least some of said heating conductors are arranged on said base material so that they lie only in the direction of said stitch wales in an area of said base material outside of said heating area.

5. The two-dimensional heating element of claim 1, wherein at least some of said heating conductors are arranged on said contact conductors so that they lie only in the direction of said stitch wales and run without changes with respect to adjacent stitch wales.

6. The two-dimensional heating element of claim 1, wherein at least some of said heating conductors run with changes with respect to the direction of said stitch wales in an area of said base material outside of said heating area.

7. The two-dimensional heating element of claim 1, wherein at least some of said heating conductors run with changes with respect to the direction of said stitch wales in an area of said contact conductors.

8. The two-dimensional heating element of claim 1, wherein said heating conductors float on said base material in an area outside of said heating area and outside of said contact conductors.

9. The two-dimensional heating element of claim 4, wherein said heating conductors float on said base material in an area outside of said heating area and outside of said contact conductors.

10. The two-dimensional heating element of claim 1, wherein said heating area comprises a main area and a secondary area arranged along the direction of said contact conductors, wherein an amount of heating conductor material applied per unit area in said main area is different than an amount of heating conductor material applied per unit area in said secondary area.

11. The two-dimensional heating element of claim 1, wherein said pattern is a knitted weave consisting of a weave from the group including a pillar-stitch, a pillar-weft, a tricot, and a satin weave.

12. The two-dimensional heating element of claim 1, wherein said contact conductors are metallic.

13. The two-dimensional heating element of claim 1, wherein said heating conductors are carbon fibers.

14. The two-dimensional heating element of claim 1, wherein said two dimensional heating element is an electrical seat heater.

15. An electrical seat heater, comprising at least one two-dimensional heating element, wherein said at least one two-dimensional heating element comprises:

a base material;

contact conductors being electrically conductive and arranged on said base material such that said contact conductors delimit a heating area on said base material; and heating conductors being electrically conductive and arranged on said base material for contacting said contact conductors and creating an electric connection therebetween, said heating conductors being arranged to form a pattern defining stitch wales, wherein some portions of said heating conductors are laid in the direction of said stitch wales and other portions of said heating conductors are laid orthogonal to said stitch wales in at least two zones of said heating area, said at least two zones comprising a main heating area having a first heating capacity and a secondary heating area having a second heating capacity, said first heating capacity being different than said second heating capacity.

16. A method of producing a two-dimensional heating element having contact conductors defining a heating area on a base material and heating conductors arranged on the base material and contacting the contact conductors, said method comprising the steps of:

applying the contact conductors to the base material prior to a knitting process; and performing the knitting process which includes detecting one of the contact conductors and markings on the base material using a sensor system arranged upstream of needles of a knitting machine, controlling a guide rail for the needles of the knitting machine in response to the sensor system, and connecting the heating conductors to the base material and the contact conductors via the needles and guide rail of the knitting machine.

17. The method as claimed in claim 16, wherein said step of detecting one of the contact conductors and markings on the base material by the sensor system includes using a sensor comprising one of a capacitive, an inductive, and an optical sensor.

18. The method of claim 16, wherein said step of performing a knitting process produces a two-dimensional heating element including a pattern defining stitch wales, wherein some portions of the heating conductors are laid in the direction of the stitch wales and other portions of the heating conductors are laid orthogonal to the stitch wales in at least two zones of the heating area, the at least two zones comprising a main heating area having a first heating capacity and a secondary heating area having a second heating capacity, and the first heating capacity being different than the second heating capacity.

19. An apparatus for producing a two-dimensional textile heating element via a knitting process, said apparatus comprising:

at least one guide rail and needles arranged for knitting heating conductors onto a base material, said guide rail arranged for guiding said needles during the knitting; and at least one sensor system arranged for detecting one of a contact conductor and markings applied to the base material and operatively connected to said guide rail for controlling said at least one guide rail during the knitting.

20. The apparatus of claim 19, further comprising a distance-measuring device for determining the distance traveled by the base material.

* * * * *